United States Patent [19]

Shiozawa et al.

[11] Patent Number: 4,650,658

[45] Date of Patent: Mar. 17, 1987

[54] STABLE CRYSTALS OF SODIUM BROMITE TRIHYDRATE

[75] Inventors: Hisao Shiozawa, Saitama; Kihachiro Matsuda, Yamaguchi, both of Japan

[73] Assignee: Nippon Silica Industrial Co., Ltd., Tokyo, Japan

[21] Appl. No.: 796,524

[22] Filed: Nov. 12, 1985

Related U.S. Application Data

[63] Continuation of Ser. No. 606,188, May 2, 1984, abandoned.

[30] Foreign Application Priority Data

Dec. 5, 1983 [JP] Japan ................................ 58-83400
Jun. 3, 1984 [JP] Japan ................................ 59-42262

[51] Int. Cl.$^4$ .............................................. C01B 11/00
[52] U.S. Cl. ...................................... 423/462; 23/296; 23/302 T; 252/186.36; 423/266; 423/274; 423/275
[58] Field of Search ............... 423/462, 472, 641, 643, 423/266, 274, 275; 252/186.25, 186.36, 187.2; 23/296, 302 T

[56] References Cited

U.S. PATENT DOCUMENTS 3,085,854  4/1963  Meybeck et al. .................... 423/472
3,967,039  6/1976  Ninane et al. ....................... 423/472

FOREIGN PATENT DOCUMENTS 25543  11/1964  Japan .

OTHER PUBLICATIONS

Chemical Engineers' Handbook, 5th ed. Ed. by Robert H. Perry, Cecil H. Chilton, McGraw-Hill Book Co. 1973, pp. 17-12, 17-13, 19-94.

*Primary Examiner*—John Doll
*Assistant Examiner*—Jeffrey Edwin Russel
*Attorney, Agent, or Firm*—Oblon, Fisher, Spivak, McClelland & Maier

[57] ABSTRACT

$NaBrO_2.3H_2O$ crystals with excellent storage stability which contain at least 30 wt. % of $NaBrO_2.3H_2O$ and 0.5–5.0 wt. % of NaOH. The crystals are produced by precipitation from $NaBrO_2$ solutions containing NaOH and impurities and are very useful as oxidizing and brominating agents.

2 Claims, No Drawings

STABLE CRYSTALS OF SODIUM BROMITE TRIHYDRATE

This application is a continuation of application Ser. No. 606,188, filed May 2, 1984, now abandoned.

BACKGROUND OF THE INVENTION

1. Field of the Invention

The present invention relates to stable crystals of sodium bromite trihydrate ($NaBrO_2.3H_2O$) useful as brominating or oxidizing agents, and also relates to a process for preparing stable $NaBrO_2.3H_2O$ crystals containing impurities such as $NaBr.2H_2O$, $NaBrO_3$ and others from an aqueous alkaline solution of sodium bromite combining operations of concentration under a reduced pressure, separation and cooling.

2. Description of the Prior Art

Sodium bromite ($NaBrO_2$) has been conventionally known as a characteristic oxidizing agent, in that the oxidizing capacity of sodium bromite lies between that of strong oxidizing agents such as $Cl_2$, $Br_2$, $NaClO$, $KMnO_4$ and $Na_2Cr_2O_7$ and that of weak oxidizing agents such as $KBrO_3$ and $NaClO_3$ and the sodium bromite itself turns into a nonpolluting substance $NaBr$ after it has performed the oxidation reaction. This compound has also been known as a brominating agent. Sodium bromite can be prepared typically by the relatively complex method that appeared in Japanese Patent Publication No. Sho 39-25543, in which the compound is prepared from $NaOH$, $Br_2$ and $Cl_2$ as raw materials. Aqueous alkaline solutions of sodium bromite prepared in this way are used for removing sizing agents such as starch, PVA and CMC in textile fibers and for controlling slime in industrial waters. However, the effective available bromine that stands for the amount of effective components gradually decreased day by day when the compound is given in a form of an aqueous solution. Sometimes the solution causes troubles in actual uses. Therefore, development and supply of sodium bromite of high storage stability has been desired.

The mentioned aqueous alkaline solution of sodium bromite is the only commercially available sodium bromite. The solution contains $NaBr$ and other salts in almost saturated concentrations together with $NaOH$ as alkali, and the concentration of $NaBrO_2$ is as low as about 0.5 mil/liter. Such a dilute solution is inconvenient to use. Further, specific properties of sodium bromite as oxidizing agent are not known and other latent properties remain unrevealed. However, if this compound could be supplied in a form of stable solid of relatively high purity, developments for novel uses will be expected other than for removing sizing agent in textile fibers and for slime controlling of industrial water.

Methods for stablizing sodium bromite so far proposed include a stabilizing method by partially removing other salts present in the solution (Japanese Patent Publication No. Sho 45-37135) and a stabilized storage method in which hydrobromite or its salts thereof is reacted with a polymer containing quaternary ammonium group (Japanese Laid-Open patent application Nos. Sho 56-78406 and Sho 56-104704). Products by the former, Patent Publication No. Sho 45-37135, cannot be stored for a long term with sufficient stability, and products by the latter methods, Laid-Open patent application Nos. Sho 56-78406 and Sho 56-104704, though provided with slightly improved stability, require additional treatments when they are used for conventional purposes. In short, neither of these can be satisfactory in practical uses as a stabilizing or stabilized storage method.

Namely, decomposition of sodium bromite is presumed to be generally accelerated by the presence of heavy metals. In fact, presence of a minute amount of nickel and chromium has been confirmed in industrially produced aqueous solutions of sodium bromite. Further, it is believed that the stability of $NaBrO_2$ in an aqueous solution is lowered when the solution contains relatively large amounts of other salts such as $NaBr$ and $NaBrO_3$.

Therefore, if sodium bromite having highly improved stability can be produced in a solid state, wider and different applications will be open to such sodium bromite, used as oxidizing and brominating agents.

Other knowledges on the same subject can be found in French Pat. No. 1,216,216 and the additional Patent thereof No. 72718. They teach stabilization of highly purified $NaBrO_2.3H_2O$ by dissolving it in an aqueous alkaline solution.

Investigations have been done by the present inventors on French Pat. No. 1,216,216 using an aqueous $NaOH$ solution and high purity product (more than 95% of purity) of $NaBrO_2.3H_2O$ was obtained by re-crystallization method. Stability was tested on the $NaBrO_2.3H_2O$ crystals on an aqueous alkaline solution thereof. The $NaBrO_2$ in the aqueous alkaline solution gradually decomposed as time went on, but the rate of decomposition was slower than that of the original raw material sodium bromite in an aqueous alkaline solution. On the other hand, however, the purified crystals themselves were less stable than the original raw material. The process of decomposition reaction can be recognized by eyes because yellow $NaBrO_2$ turns into white $NaBr$ and $NaBrO_3$ on decomposition. The decomposition proceeds rather quickly in a single crystal. Thus, it is observable with a large crystal of $NaBrO_2.3H_2O$ having 5 to 10 mm longer diameter that the decomposition reaction proceeds from one end to another.

In conclusion, therefore, $NaBrO_2$ produced by the above-mentioned process is unexpectedly more stable when it is in the form of an aqueous alkaline solution than $NaBrO_2.3H_2O$ crystals, though the reason therefor is not clear. The process for preparing high purity $NaBrO_2.3H_2O$ is laborious, but nevertheless the crystals thus obtained are less stable. Therefore, these prior arts have no specific advantages over the conventional arts of storing $NaBrO_2$ in the form of solution.

SUMMARY OF THE INVENTION

Therefore, one of the objects of the present invention is to provide $NaBrO_2.3H_2O$ crystals (crystals mainly composed of $NaBrO_2.3H_2O$) having an excellent stability and useful as a brominating or oxidizing agent.

Another object of the present invention is to provide a process for producing $NaBrO_2.3H_2O$ crystals having an excellent stability.

A further object of the present invention is to provide an oxidizing or brominating agent consisting of or comprising $NaBrO_2.3H_2O$ crystal.

The term "$NaBrO_2.3H_2O$ crystals" used in the present invention means a mixture of pure $NaBrO_2.3H_2O$ crystals and $NaOH$ and unavoidable impurities adhering thereon.

The $NaBrO_2.3H_2O$ crystals according to the present invention is given the excellent stability by NaOH contained in the crystals or adsorbed on the surface of the crystals.

The $NaBrO_2.3H_2O$ crystals containing or coated with NaOH according to the present invention is produced by evaporation of an aqueous alkaline solution of sodium bromite containing NaOH and impurity salts to concentrate the solution by removal of impurity salts and cooling the concentrated solution to deposit crystals mainly composed of $NaBrO_2.3H_2O$ in an amount from 30 to 98 wt. %.

The $NaBrO_2.3H_2O$ crystals containing or coated with NaOH according to the present invention are useful as oxidizing and brominating agents.

DETAILED DESCRIPTION OF THE INVENTION

The present invention has been completed on the following discoveries.

When $NaBrO_2.3H_2O$ crystals are obtained by concentrating an aqueous alkaline solution of sodium bromite containing $NaBrO_2$, NaBr, $NaBrO_3$ and NaOH under a reduced pressure to remove impurity salts such as $NaBrO_3$ by precipitation, and then separating $NaBrO_2.3H_2O$ crystals by centrifugation, for example, the stability of the resultant $NaBrO_2.3H_2O$ crystals depends largely on the level of NaOH contents and can be surprisingly increased if the separation of the mother solution from the crystals in the final step is so controlled as to retain a predetermined amount of NaOH in or on the crystals. It has been discovered a lower content of NaOH in the crystals tends to facilitate the decomposition of the $NaBrO_2.3H_2O$ crystals. What is more worthy of mentioning is that the desired stability of $NaBrO_2.3H_2O$ crystals cannot be developed merely by mixing solid of NaOH with $NaBrO_2.3H_2O$ crystals.

It may be assumed from the above facts in view of the fact that $NaBrO_2$ is stable in the form of an aqueous alkaline solution, that $NaBrO_2.3H_2O$ crystals, when exposed to the air, will be gradually neutralized by $CO_2$ contained in the air, and if the NaOH content in the crystals is low, the neutralization of $NaBrO_2.3H_2O$ crystals proceeds to such a degree that the crystals decompose before actual use in final applications.

For coating the $NaBrO_2.3H_2O$ crystals with the NaOH solution, the separation degree of the mother liquid containing NaOH from the $NaBrO_2.3H_2O$ crystals is controlled as mentioned above. In addition, where the separation degree can be maintained constant without a specific control, the concentration of NaOH in the mother liquid may be controlled so as to retain the NaOH coating in an amount more than a predetermined amount, or further a predetermined amount of a solution containing NaOH may be sprayed onto the $NaBrO_2.3H_2O$ crystals without or with subsequent drying. In this way the $NaBrO_2.3H_2O$ crystals are coated with a solution containing NaOH which eventually form a thin film containing NaOH on the surface of the crystals.

Regarding the concentration of NaOH in the solution to be retained or to be applied to the surface of the $NaBrO_2.3H_2O$ crystals, 0.5–5.0 wt. % is preferable in the case the $NaBrO_2.3H_2O$ crystals are precipitated from the solution containing $NaBrO_2$, NaOH and impurities ($NaBrO_2.3H_2O$ crystals +NaOH+impurities=100 wt. %).

According to a preferred embodiment of the present invention, the stable $NaBrO_2.3H_2O$ crystals are obtained by a process comprising:

Step 1 where an aqueous alkaline solution of sodium bromite containing $NaBrO_2$, NaBr, $NaBrO_3$ and NaOH and in addition NaCl depending on the process of preparation, is used for starting solution and this is concentrated under a reduced pressure by heating it at a temperature ranging from 40° C. to 80° C. and under a pressure reduced to 5 to 50 Torrs until the concentration of $NaBrO_2$ exceeds 350 g/l, while the whole solution is vigorously stirred so that the liquid phase temperature in the vicinity of the heating part does not exceed 40° C., for instance, keeping the outlet temperature of the cooling water for vapor condensation not higher than 20° C.;

Step 2 where deposited impurity salts, other than $NaBrO_2$, are removed and separated by centrifugation, etc.;

Step 3 where the concentrated solution after Step 2 is cooled down to below the saturation temperature of $NaBrO_2$, generally below 5° C.; and Step 4 where the deposited crystals are separated from the mother liquid by centrifugation, etc. in a controlled method so as to retain a thin film of the mother liquid on the resultant crystals. The resultant $NaBrO_2.3H_2O$ crystals contain about 20% or more of impurities such as $NaBr.2H_2O$, $NaBrO_3$, $H_2O$ and NaOH.

In Step 1, the solution is vigorously agitated so that the temperature of liquid around the heating part does not exceed 40° C. and the outlet temperature of the cooling water for condensation is kept not higher than 20° C. As a result, the whole solution is heated to 40° to 80° C., preferably 55° to 65° C., with a pressure reduced to 5 to 50 Torrs. This process enables to prepare a concentrated solution in a much shorter time without decomposition of $NaBrO_2$ resulting from partial elevation of temperature of the liquid phase. This process of concentration under a reduced pressure is repeated twice or more depending on Step 2. This is favorable when a concentrated solution with a higher concentration of $NaBrO_2$ is concentrated at a low rate of concentration.

Cost required for the process is most remarkably influenced by loss of valuable $NaBrO_2$. For this reason, the mother liquid from which $NaBrO_2.3H_2O$ crystals deposited by cooling have been separated, favorably contains a minimum amount of $NaBrO_2$. In other words, the concentrated solution obtained from the aqueous alkaline solution of sodium bromite by concentrating it under a reduced pressure and separating deposited salts formed preferably contains a high concentration of $NaBrO_2$ so that only a small amount of $NaBrO_2$ remains in solution after most of $NaBrO_2$ has been deposited by cooling. For this end, however, if the concentration is continued under a reduced pressure simply until a concentration of $NaBrO_2$ 600 g/l is attained, a large amount of salts is deposited from the aqueous alkaline solution of sodium bromite and it is practically difficult to separate the deposited salts from the concentrated mother liquid. In practice, the concentration under a reduced pressure and the separation of the deposited salts are repeated, preferably more than twice, to substantially prepare a concentrated solution of 600 g/l of $NaBrO_2$.

In Step 2, centrifugation is desirably used to separate salts other than $NaBrO_2$, because those salts other than $NaBrO_2$ which the original raw material solution contains almost to saturation will be removed from the mother liquid most effectively by centrifugation. The separation can be done by employing an ordinary centrifugal separator and an acceleration of 500 to 2500×G for 30-90 seconds. Generally speaking, the better separation will result, the longer is the time for separation. However, longer time of the procedure causes an increased amount of decomposed $NaBrO_2$. Therefore, the separation is preferably accomplished in a shorter time so as to avoid disadvantages in recovery due to the decomposition. Other than the centrifugation, filter pressing and vacuum filtration may be used for the separation.

Further in Steps 3 and 4, the solution is first cooled generally below 5° C. and crystals of deposited $NaBrO_2.3H_2O$ are removed by centrifugation, etc. The mother liquid is again cooled down to a temperature, lower than the previous cooling temperature, preferably from $-20°$ C. to $-30°$ C., and crystals of deposited $NaBrO_2.3H_2O$ are separated by centrifugation. Thus, most part of $NaBrO_2$ in the mother liquid could be recovered in the form of $NaBrO_2.3H_2O$ crystals and loss of $NaBrO_2$ as unrecovered can be suppressed at a low level.

In Step 4, the viscous mother liquid due to high concentration of NaOH is effectively separated from relatively fine crystals in 30 to 90 seconds employing a centrifugal (or vacuum) separator which is operated at a centrifugal acceleration 500 to 2500×G. Since the time required for the separation markedly affects the stability of $NaBrO_2.3H_2O$ crystals in the storage period and the stability is remarkably lowered as the time is elongated. Therefore, the separation time less than 90 seconds is necessary to obtain stable $NaBrO_2.3H_2O$ crystals.

According to the present invention, $NaBrO_2$ can be recovered easily in Step 2 without any additional burden to the concentration step, by washing salts other than $NaBrO_2$ that were deposited and separated with an aqueous alkaline solution of sodium bromite. The solution containing recovered $NaBrO_2$ can be returned to the starting or concentrated solution.

The aqueous alkaline solution to be used in this invention can be prepared from an aqueous solution of NaOH and $Br_2$; or from an aqueous solution of NaOH, $Br_2$ and $Cl_2$; or from NaBr, $Cl_2$ and an aqueous solution of NaOH, in the following way.

$NaBrO_2$ could be prepared from NaBrO, which can be prepared from NaOH and $Br_2$ as shown in Reaction (1) or from the reaction of NaClO produced from NaOH and $Cl_2$ as in Reaction (2) with NaBr shown by Reaction (3), by controlling the reaction solution to pH 11 to 12 and the temperature 0° to $-5°$ C. to promote the disproportional reaction (4).

$2NaOH + Br_2 \rightarrow NaBrO + NaBr + H_2O$ (1)

$2NaOH + Cl_2 \rightarrow NaClO + NaCl + H_2O$ (2)

$NaBr + NaClO \rightarrow NaBrO + NaCl$ (3)

$2NaBrO \rightarrow NaBrO_2 + NaBr$ (4)

As the concentration of NaBrO increases with the progress of Reactions (1) or (3), the amount of $NaBrO_2$ formed gradually increases according to Reaction (4). When the concentration of $NaBrO_2$ reaches a maximum value, Reaction (4) is stopped by adding an aqueous solution of NaOH to make the reaction solution strongly alkaline Then remaining NaBrO is entirely eliminated by adding a reducing agent such as acetone and ammonia as shown in Reactions (5) or (6) to finally obtain an aqueous alkaline solution of sodium bromite.

$CH_3COCH_3 + 3NaBrO \rightarrow CHBr_3 + CH_3COONa + 2NaOH$ (5)

$2NH_3 + 3NaBrO \rightarrow 3NaBr + 3H_2O + N_2$ (6)

The aqueous alkaline solution of sodium bromite thus produced contains about 70-90 g/l of $NaBrO_2$, 30-40 g/l of $NaBrO_3$ about 12-16 g/l of NaOH and 100-120 g/l of NaBr, and 200-240 g/l of NaCl depending on the solution preparation procedure.

Concentration of the $NaBrO_2$ solution should better be performed under a reduced pressure to accelerate evaporation of water, because $NaBrO_2$ is apt to be decomposed gradually when kept at a high temperature. For concentrating the solution without decomposing $NaBrO_2$, there are proposed concentrating at a temperature lower than 30° C. (French Pat. No. 72718 additional Patent to Patent No. 1,216,216), and lower than 50° C. (Japanese Patent Publication No. Sho 45-37136). However, neither is suited to the preparation of a solution highly concentrated with respect to $NaBrO_2$.

A recommended procedure of preparing a concentrated solution in a short time is that the pressure is kept at a pressure reduced to 5 to 50 Torrs, preferably to 10 to 20 Torrs, a heating bath or a heater tube is kept at 50° to 80° C., vicinity of the heating part is vigorously agitated so that the temperature of the liquid phase does not exceed 40° C., or, when a rotary evaporator is used, the flask should be rotated sufficiently fast, generally over 60 rpm, and the outlet temperature of cooling water for vapor condensation is adjusted to be kept below 20° C., so that the total process of concentration finishes within 5 hours.

As has been described above, the aqueous alkaline solution of sodium bromite contains salts such as NaBr, as well as $NaBrO_2$ and NaOH, in almost saturation concentrations, so that a large amount of salts deposit as the concentration proceeds. When the liquid phase concentration of $NaBrO_2$ exceeds 350 g/l, deposited salts are separated from the concentrated solution by centrifugation, etc. The remaining concentrated solution is then cooled down to a temperature below the saturation temperature of $NaBrO_2$, generally lower than 5° C., and $NaBrO_2.3H_2O$ crystals deposited are separated also by centrifugation, etc.

The $NaBrO_2.3H_2O$ content of the crystals thus prepared is largely dependent on the concentrations of $NaBrO_2$ and NaOH of the concentrated solution and the cooling temperature, especially on the mentioned concentrations. The concentration of NaOH is determined by the concentration of NaOH in the starting aqueous alkaline solution of sodium bromite and the extent of concentration. Usually, the aqueous alkaline solution of sodium bromite contains about 80 g/l of $NaBrO_2$ and about 15 g/l of NaOH, while the concentrated solution of 350 g/l of $NaBrO_2$ contains about 65 g/l of NaOH.

The aqueous solution mentioned deposits crystals containing $NaBrO_2.3H_2O$ when cooled at 5° C. or lower. When the concentration of $NaBrO_2$ in the solution is 350, 500 and 600 g/l, $NaBrO_2.3H_2O$ content of crystals is approximately 30, 60 and 70%, respectively. The crystals contain, other than $NaBrO_2.3H_2O$, salts such as $NaBr.2H_2O$, $NaBrO_3$, NaOH and $H_2O$.

For example, if 7 to 8 liters of $H_2O$ is evaporated from 10 liters of an aqueous alkaline solution of sodium bromite so as to obtain an $NaBrO_2$ concentration of 600 g/l in the liquid phase, as much as 2.5 to 3.0 kg of salts are deposited leaving a very concentrated slurry. This is difficult to further concentrate. Almost all the liquid phase is held on the deposited salts, and therefore separation of the liquid from the salts is substantially difficult, as mentioned before.

To overcome the difficulty encountered in the concentration of an aqueous alkaline solution of sodium bromite under a reduced pressure, evaporation is stopped when 4 to 6 liters of $H_2O$ have been evaporated out of 10 liters of the solution, deposited salts are separated, and the obtained concentrated solution is further concentrated under a reduced pressure until a concentration of 600 g/l with $NaBrO_2$ in the liquid phase is obtained. This procedure allows to recover 50 to 70% of $NaBrO_2$ in the form of a concentrated solution from the above-mentioned 10 liters of aqueous alkaline solution of sodium bromite.

Repeated operations of concentration under a reduced pressure followed by separation of deposited salts is advantageous for effectively preparing a concentrated solution of $NaBrO_2$ of more than 600 g/l. If the number of repetition is increased, the amount of mother liquid, or the amount of $NaBrO_2$, held on the deposited salts can be reduced, hence increased yield of $NaBrO_2$ in the form of a concentrated solution and improved efficiency of productivity in the concentration step. On the other hand, $NaBrO_2$ held on deposited salts is better recovered and the mentioned repeated operations are also useful to the purpose and advantageously reduce the need of washing as recovery process.

When the operations are repeated three times, about 90% of $NaBrO_2$ can be recovered in the form of a concentrated solution.

When several vessels are used for the concentration under a reduced pressure to successively increase the concentration, deposited salts can be separated between two successive vessels and the concentrated solution can be delivered alone to the next vessel. This process is easy to operate and advantageous, since the slurry concentration of deposited salts can be kept at a lower level in vessels.

The concentrated solution containing more than 600 g/l of $NaBrO_2$ thus prepared, when cooled down to lower than the saturation temperature, generally below 5° C., deposits relatively pure crystals which contain more than 70% of $NaBrO_2.3H_2O$. In this situation, the concentrated solution of $NaBrO_2$ of 600 g/l also contains about 110 g/l of NaOH, and a temperature of 40° to 50° C. is maintained because the concentration under a reduced pressure is carried out under heating. Here the concentration of $NaBrO_2$ 600 g/l is close to saturation and, therefore, it is substantially impossible to further concentrate 600 to 650 g/l into 700 or 800 g/l.

The mother liquid after the deposited $NaBrO_2.3H_2O$ crystals, formed by cooling, have been separated cannot be recovered for further utility, but a yield of $NaBrO_2$ to form crystals could be increased by elevating the concentration of $NaBrO_2$ to over 600 g/l in the concentrated solution.

Regarding the amount of NaOH, no additional amount is normally needed other than that contained in the aqueous alkaline solution of sodium bromite. However, NaOH may be added to the solution so as to assure a certain concentration of the solution to be coated on the surface of $NaBrO_2.3H_2O$ crystals.

When the deposition under a reduced pressure is carried out in an continuous process, the separated mother liquid can be circulated to control the slurry concentration of deposited $NaBrO_2.3H_2O$ crystals low enough so that the cooling can be as low as $-5°$ to $-10°$ C.

If the condition is observed that the concentration of $NaBrO_2$ is higher than 600 g/l and the cooling temperature is below 5° C., 80 to 95% of the $NaBrO2$ contained in the concentrated solution could be recovered in the form of $NaBrO_2.3H_2O$ crystals.

The salts which are separated in a large amount from the concentrated solution in Step 2 hold the mother liquid on their surfaces. $NaBrO_2$ contained in the mother liquid could be recovered to a larger part simply by washing the salts with an original aqueous alkaline solution of sodium bromite. The amount of $NaBrO_2$ remaining on the salts amounts to 1/5 to 1/10 of that before the washing. Thus, the washing is effective for suppressing loss of $NaBrO_2$, especially when a highly concentrated solution is involved to separate salts.

The mother liquid from which deposited $NaBrO_2.3H_2O$ crystals have been separated once is then cooled down below the first cooling temperature, preferably below $-20°$ C., to deposit $NaBrO_2.3H_2O$ crystals in the mother liquid. More than 50% of $NaBrO_2$ dissolved in the mother liquid could be separated in the form of crystals by cooling. The crystals obtained here are less pure than those obtained in the first deposition and separation operation, but they may be used as they are without leading to any trouble. They may also be dissolved in an aqueous alkaline solution of sodium bromite for recovery.

In the present invention, the separation of the mother liquid from the $NaBrO_2.3H_2O$ crystals is preferably performed in a controlled method so that the mother liquid is retained on the surface of the $NaBrO_2.3H_2O$ crystals in a thin film form containing 0.5–5.0 wt. % of NaOH. In this way, the amount of NaOH remaining on the surface of the $NaBrO_2.3H_2O$ crystals can be adjusted by controlling the separation degree of the mother liquid and the concentration of NaOH in the mother liquid.

The $NaBrO_2.3H_2O$ crystals prepared by the above process are stable enough irrespective of the difference in the $NaBrO_2.3H_2O$ contents. Experiment confirmed that the rate of decomposition of $NaBrO_2$ in the lapse of time is 1/5 to 1/7 against that of conventional aqueous alkaline solution of sodium bromite and that of alkaline sodium bromite prepared by the process disclosed in the Japanese Patent Publication No. Sho 45-37135.

The stability of $NaBrO_2$ during storage, though dependent on the temperature during storage, was examined at a constant temperature of 30° C. assuming storage in summer. The undecomposed $NaBrO_2$ in an approximate percentage, which is of course 100% on the first day of storage, was found in a month about 65% for a starting aqueous alkaline solution of sodium bromite, about 75% for an aqueous alkaline solution of sodium bromite stabilized by the method disclosed in the Japanese Patent Publication No. Sho 45-37135, while about 95% for $NaBrO_2.3H_2O$ crystals prepared according to this invention.

The result shows that the amount of decomposition of $NaBrO_2$ prepared by the process of the present invention in half a year approximately corresponds to the amount of $NaBrO_2$ decomposed in a month when the $NaBrO_2$ is prepared by a conventional method. It is apparent therefore that the former product is satisfactory for practical uses.

The coating of $NaBrO_2.3H_2O$ crystals with the NaOH solution in the present invention may be done by a method other than the method mentioned hereinabove. For example, the $NaBrO_2.3H_2O$ crystals may be immersed in an aqueous solution of NaOH and dried.

$NaBrO_2.3H_2O$ crystals prepared by the method of the present invention can be used by simply dissolving in water as an alternative for a conventional aqueous alkaline solution of sodium bromite, and because of the relatively small contents of impurities, they can be used to prepare aqueous solutions of a wide range of $NaBrO_2$ concentrations and because of the lower content of NaOH relative to $NaBrO_2$ they can be used in applications where alkali should be avoided.

$NaBrO_2.3H_2O$ crystals prepared by the process of the present invention, as compared with conventional aqueous alkaline solutions of sodium bromite, weighs $\frac{1}{4}$ to 1/10 for obtaining equal amounts of $NaBrO_2$. This is beneficial to save space for storage and energy for transportation, and in addition, the solid matter is easy to weigh and adjust concentrations.

DESCRIPTION OF PREFERRED EMBODIMENT

The present invention will be better understood from the following description of preferred embodiments.

EXAMPLE 1

An aqueous solution of NaOH containing NaClO was prepared from 20 kg of a 23% aqueous solution of NaOH by maintaining the solution at 15° C. and blowing into it 2.72 kg of $Cl_2$ gas under stirring. Keeping the temperature of the solution at 0° C., 3.07 kg of $Br_2$ was dropwise added under stirring and, controlling the pH at 11 to 12, $NaBrO_2$ was formed. When the concentration of $NaBrO_2$ reached a maximum value, 1.15 kg of a 23% aqueous solution of NaOH was added to stop the formation of $NaBrO_2$. Then, while the temperature was kept at $-12°$ C. or lower, $NH_3$ gas was blown into the solution little by little, to eliminate the NaBrO. Thus, an aqueous alkaline solution of sodium bromite (Aqueous solution 1) containing 81.6 g/l of $NaBrO_2$, 14.9 g/l of NaOH, 36.2 g/l of $NaBrO_3$, 110.6 g/l of NaBr and 224.8 g/l of NaCl was obtained.

Each 10 liters of said aqueous solution of sodium bromite was heated to concentrate at a bath temperature 60° C. under a reduced pressure to 20 Torrs. When 3.8 liters and further 2.1 liters of $H_2O$ was removed, the concentration procedure was stopped and deposited salts were separated. After the repeated separation of deposited salts, one of the concentrated solutions contained 383.7 g/l of $NaBrO_2$ and 72.2 g/l of NaOH and the other 452.3 g/l of $NaBrO_2$ and 82.1 g/l of NaOH. The volumes amounted to 1.97 and 1.64 liters, respectively.

A fraction of the concentrated solutions was diluted with distilled water to prepare an aqueous solution (Aqueous solution 2) containing 80.7 g/l of $NaBrO_2$ and 15.1 g/l of NaOH and an aqueous solution (Aqueous solution 3) containing 79.6 g/l of $NaBrO_2$ and 14.9 g/l of NaOH. Remainders of the concentrated solutions were cooled to $-2°$ C. to 0° C. and $NaBrO_2.3H_2O$ crystals deposited were separated from the mother liquid by centrifugation at 1500×G for 60 seconds. The $NaBrO_2.3H_2O$ contents of the obtained crystals amounted to 32.3% (Crystal 1) and 45.1% (Crystal 2) and NaOH contents in these crystals were 0.7% (Crystal 1) and 0.8% (Crystal 2).

Samples of Aqueous solutions 1, 2 and 3 and Crystals 1 and 2 were kept in a 30° C. constant temperature bath, assuming storage in summer, and rates of undecomposed percentage of $NaBrO_2$, as determined on the 30th and 90th days, are shown in Table 1.

TABLE 1

| Sample | Rate of Undecomposed $NaBrO_2$ (%) | | |
|---|---|---|---|
| | 1st day | 30th day | 90th day |
| Aqueous Solution 1 | 100 | 63.8 | 27.2 |
| Aqueous Solution 2 | 100 | 72.7 | 38.6 |
| Aqueous Solution 3 | 100 | 73.5 | 39.9 |
| Crystal 1 | 100 | 97.2 | 93.3 |
| Crystal 2 | 100 | 96.8 | 93.7 |
| Crystal 3 | 100 | 68.5 | 0 |
| Crystal 4 | 100 | 51.3 | 0 |

COMPARISON 1

The crystals 1 and 2 prepared in Example 1 were further subjected to centrifugal separation at 1500×G for 5 minutes to obtain crystals (Crystal 3 from Crystal 1) containing 0.3% NaOH and crystals (Crystal 4 from Crystal 2) containing 0.4% NaOH. The results of storage stability of these crystals are shown in Table 1.

EXAMPLE 2

An aqueous alkaline solution of sodium bromite (Aqueous solution 4) amounting to 10 liters prepared in the same way as in Example 1 and containing 81.1 g/l of $NaBrO_2$, 15.1 g/l of NaOH, 36.7 g/l of $NaBrO_3$, 109.5 g/l of NaBr and 223.8 g/l of NaCl was heated for concentration on a water bath at 60° C. under a reduced pressure by 20 Torrs. The concentration was stopped successively when 3.7 and then 2.3 liters of $H_2O$ was removed. Salts deposited were separated and the concentrated solution obtained was further concentrated under a reduced pressure, and deposited salts were separated again, to obtain 1.17 liter of a concentrated solution containing 640.2 g/l of $NaBrO_2$ and 120.4 g/l of NaOH. The concentrated solution was cooled at $-2°$ C. to 0° C. and crystals formed were separated from the mother liquid by centrifugation at 1500×G for 60 seconds. The crystals (Crystal 5) amounted to 1310.1 g and contained 71.0% of $NaBrO_2.3H_2O$ and 1.0% of NaOH. In conclusion, it was found that 88.7% of the total amount of $NaBrO_2$ contained in the concentrated solution was recovered in $NaBrO_2.3H_2O$ crystals.

The mother liquid which resulted after cooling at $-2°$ C. to 0° C. followed by separation of $NaBrO_2.3H_2O$ crystals was further cooled at $-20°$ C. to $-22°$ C. and then $NaBrO_2.3H_2O$ crystals deposited were separated by centrifugation at 1500×G for 60 seconds. The crystals (Crystal 6) amounted to 270.6 g and contained 25.2% of $NaBrO_2.3H_2O$ and 1.4% of NaOH. The amount of $NaBrO_2$ recovered from the concentrated solution in the form of crystal was found to be 95.2% in total, including 88.7% described above.

Three different groups of salts obtained at three different stages of procedure for the concentration were washed each with 1 liter of the aqueous alkaline solution containing 81.1 g/l of $NaBrO_2$, which was used as starting solution. The aqueous alkaline solution of sodium bromite which originally contained 243.3 g of $NaBrO_2$ in 3 liters was found to contain 298.8 g of $NaBrO_2$ in total after the washing. The difference was 55.5 g, while the amount of NaBrO$_2$ contained in salts was estimated to 62.2 g. Difference between 62.2 g and 55.5 g is 6.7 g, corresponding to 0.8% of the total amount, 811 g, of starting material NaBrO$_2$.

The aqueous alkaline solution of sodium bromite used for the washing and recovered amounted to 3.2 liters, which contained 93.4 g/l of NaBrO$_2$.

Results of storage stability test at 30° C. are shown in Table 2 with respect to Aqueous solution 4 and Crystals 5 and 6.

TABLE 2

| Sample | Rate of Undecomposed NaBrO$_2$ (%) | | |
|---|---|---|---|
|  | 1st day | 30th day | 90th day |
| Aqueous Solution 4 | 100 | 64.0 | 27.3 |
| Crystal 5 | 100 | 97.4 | 93.0 |
| Crystal 6 | 100 | 96.2 | 91.9 |
| Crystal 7 | 100 | 71.4 | 0 |
| Crystal 9 | 100 | 97.0 | 92.4 |
| Crystal 10 | 100 | 97.2 | 92.5 |

COMPARISON 2

The crystals (Crystal 5) obtained in Example 2 was further subjected to centrifugal separation at 1500×G for 5 minutes to obtain crystals (Crystal 7) containing 0.4% NaOH. The result of storage stability test of these crystals is shown in Table 2.

EXAMPLE 3

Into 10 kg of 23% aqueous solution of NaOH which was kept at about 0° C. was added 4.6 kg of Br$_2$ under agitation, and NaBrO$_2$ was formed while the pH of the solution was controlled at 10 to 11. When the concentration of NaBrO$_2$ reached maximum, the formation reaction of NaBrO$_2$ was stopped and the excessive NaBrO was eliminated in the same way as in Example 1, to obtain an aqueous alkaline solution of sodium bromite (Aqueous solution 5) containing 79.7 g/l of NaBrO$_2$, 15.0 g/l of NaOH, 35.8 g/l of NaBrO$_3$ and 489.3 g/l of NaBr.

From 10 liters of said aqueous alkaline solution of sodium bromite were obtained, in the same way and same conditions as in Example 1, 1.47 liters of a concentrated solution containing 488.2 g/l of NaBrO$_2$ and 91.7 g/l of NaOH. A fraction of the concentrated solution was diluted with distilled water, to make an aqueous solution (Aqueous solution 6) which contained 79.5 g/l of NaBrO$_2$ and 14.9 g/l of NaOH. The remainder of the concentrated solution was cooled at −2° C. to 0° C. and NaBrO$_2$.3H$_2$O crystals deposited were separated by centrifugation from the mother liquid under the same condition as in Example 1. The crystals (Crystal 8) contained 46.3% of NaBrO$_2$.3H$_2$O and 0.6% of NaOH.

Results of the storage stability test at 30° C. of Aqueous solutions 5 and 6 and Crystal 8 are shown in Table 3.

TABLE 3

| Sample | Rate of Undecomposed NaBrO$_2$ (%) | | |
|---|---|---|---|
|  | 1st day | 30th day | 90th day |
| Aqueous Solution 5 | 100 | 64.1 | 26.3 |
| Aqueous Solution 6 | 100 | 73.0 | 38.6 |
| Crystal 8 | 100 | 97.5 | 92.8 |

EXAMPLE 4

100 g of crystals obtained by Comparison 2 were sprayed with 10 ml of 10% NaOH solution by an air sprayer and fully mixed with a polyethylene spoon. The wet mixture was dryed in a vacuum dryer at a reduced pressure of 10 Torr at 40° C. for 3 hours to obtain crystals (Crystal 9) containing 1.4% of NaOH. The storage stability of these crystals is shown in Table 2.

EXAMPLE 5

NaOH was added to the NaBrO$_2$.3H$_2$O slurry of Crystal 5 obtained in Example 2 to increase the NaOH concentration in the mother liquid to 200 g/l and centrifugal separation was performed at 1500×G for 5 minutes to obtain crystals (Crystal 10) containing 0.7% NaOH. The storage stability of these crystals is shown in Table 2.

What we claim:

1. NaBrO$_2$.3H$_2$O crystals having excellent storage stability comprising at least 30 wt. % of NaBrO$_2$.3H$_2$O and 0.5–5.0 wt. % of NaOH.

2. The crystals according to claim 1, in which said NaOH is present as a coating on the surface of the crystals.

* * * * *